US012128295B2

(12) United States Patent
Briggs

(10) Patent No.: US 12,128,295 B2
(45) Date of Patent: *Oct. 29, 2024

(54) WATER RIDE ATTRACTION INCORPORATING INTERACTIVE GAME PLAY

(71) Applicant: WHITEWATER WEST INDUSTRIES, LTD., Richmond (CA)

(72) Inventor: Rick Briggs, Springfield, CA (US)

(73) Assignee: WHITEWATER WEST INDUSTRIES LTD., Richmond (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/808,280

(22) Filed: Jun. 22, 2022

(65) Prior Publication Data

US 2023/0020423 A1    Jan. 19, 2023

Related U.S. Application Data

(63) Continuation of application No. 16/188,228, filed on Nov. 12, 2018, now Pat. No. 11,389,719.

(60) Provisional application No. 62/584,656, filed on Nov. 10, 2017.

(51) Int. Cl.
| | | |
|---|---|---|
| A63G 21/18 | (2006.01) | |
| A63F 13/217 | (2014.01) | |
| A63F 13/803 | (2014.01) | |
| A63G 31/00 | (2006.01) | |
| A63F 13/837 | (2014.01) | |

(52) U.S. Cl.
CPC .......... *A63F 13/217* (2014.09); *A63F 13/803* (2014.09); *A63G 21/18* (2013.01); *A63G 31/007* (2013.01); *A63F 13/837* (2014.09)

(58) Field of Classification Search
None
See application file for complete search history.

(56) References Cited

U.S. PATENT DOCUMENTS

| | | | | |
|---|---|---|---|---|
| 5,685,778 A * | 11/1997 | Sheldon | ................... | A63G 7/00 |
| | | | | 472/128 |
| 5,785,592 A * | 7/1998 | Jacobsen | ............... | A63F 9/0291 |
| | | | | 463/7 |
| 6,220,965 B1 * | 4/2001 | Hanna | ...................... | A63G 7/00 |
| | | | | 463/52 |
| 7,905,790 B2 * | 3/2011 | Schnuckle | ............. | A63G 31/16 |
| | | | | 472/43 |

(Continued)

OTHER PUBLICATIONS

UndercoverTourist.com, "Toy Story Mania!, Hollywood Studios, Walt Disney World, (HD)," published Feb. 9, 2011, available at https://www.youtube.com/watch?v=KNRt3rnN7QQ, last accessed Apr. 8, 2023 (Year: 2011).*

(Continued)

*Primary Examiner* — Jay Trent Liddle
(74) *Attorney, Agent, or Firm* — Buchalter a Professional Corporation; Benjamin Wigger

(57) ABSTRACT

A waterslide attraction is provided that incorporates at least one waterslide element and at least one storyline element. Riders typically ride in a ride vehicle that may incorporate controls that may provide responses to stimuli presented during the ride. A user's responses to the stimuli are used to alter the storyline presented and may also alter ride characteristics. At the conclusion of the ride, a user is presented with a score.

12 Claims, 5 Drawing Sheets

(56) References Cited

U.S. PATENT DOCUMENTS

| | | |
|---|---|---|
| 9,174,704 B1 | 11/2015 | Crawford |
| 9,358,473 B2 * | 6/2016 | Frolov .................... A63G 1/24 |
| 9,463,379 B1 * | 10/2016 | Brister ................... A63F 13/42 |
| 9,764,245 B2 | 9/2017 | Weston et al. |
| 10,289,194 B2 * | 5/2019 | McCracken .......... A63F 13/211 |
| 11,389,719 B2 | 7/2022 | Briggs |
| 2001/0015148 A1 | 8/2001 | McKoy |
| 2001/0029206 A1 | 10/2001 | Henry |
| 2003/0069078 A1 | 4/2003 | Aragona et al. |
| 2006/0293110 A1 * | 12/2006 | Mendelsohn ............ A63G 1/00 |
| | | 472/137 |
| 2010/0160054 A1 * | 6/2010 | Henry .................... A63G 21/18 |
| | | 472/117 |
| 2010/0173717 A1 | 7/2010 | Yule |
| 2014/0135137 A1 * | 5/2014 | Heaven .................. A63G 21/18 |
| | | 472/117 |
| 2015/0133229 A1 * | 5/2015 | Weston .................. A63G 21/18 |
| | | 472/117 |
| 2016/0136529 A1 | 5/2016 | Weston et al. |
| 2018/0284881 A1 | 10/2018 | Briggs et al. |
| 2018/0339233 A1 * | 11/2018 | Vance ....................... A63G 1/24 |
| 2018/0339234 A1 * | 11/2018 | Vance ....................... A63G 1/24 |

OTHER PUBLICATIONS

"Toy Story Mania!, Hollywood Studios, Walt Disney World, (HD)," UndercoverTourist.com, Retrieved from Internet: https://www.youtube.com/watch?v=KNRt3rnN7QQ, Feb. 9, 2011 and last accessed Jul. 13, 2020, 2011, 2 Pages.

Advisory Action for U.S. Appl. No. 16/188,228, dated Jan. 18, 2022, 3 pages.

Final Office Action for U.S. Appl. No. 16/188,228, dated Oct. 7, 2021, 9 pages.

Notice of Allowance for U.S. Appl. No. 16/188,228, dated Mar. 17, 2022, 11 pages.

* cited by examiner

WATER RIDE ATTRACTION INCORPORATING INTERACTIVE GAME PLAY

BACKGROUND

Waterslide attractions typically provide riders with a thrilling experience of speed and lateral force upon the body as the riders slide on the attraction. A stream of water is commonly flowed along a flume from an entrance location of higher elevation to an exit location of lower elevation. A rider slides along the flume due to the stream of water, either with or without a ride vehicle, and experiences the twists, turns, and drops predetermined by the design and setup of the flume. While such attractions provide an initial rush of excitement, many use single, non-interactive elements, such as a simple bump or gentle curve, with transition sections between these single elements. The initial rush of excitement for the rider quickly diminishes with repeated riding.

SUMMARY

A waterslide attraction is provided that incorporates at least one waterslide element and at least one storyline element. Riders typically ride in a ride vehicle that may incorporate controls that may provide responses to stimuli presented during the ride. A rider's responses to the stimuli are used to alter the storyline presented and may also alter ride characteristics. Ride characteristics (e.g., speed of travel along the ride) may be manipulated or controlled by rider responses and/or may not be controlled by riders, but instead be predetermined (e.g., water jets and/or changes in elevation or slope of the attraction may be setup such that the ride's speed is lowered in areas or portions of the ride where rider responses or storytelling is provided, for example, to give rider's time to properly interact and/or view the storytelling. At the conclusion of the ride, a user may be presented with a score or other conclusion based upon the rider's responses.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

The detailed description of exemplary embodiments herein makes reference to the accompanying drawings and pictures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present invention relates generally to water ride attractions. More particularly, the present invention relates to waterslide attractions capable of incorporating interactive game play that may alter ride characteristics. Exemplary embodiments provide an improved waterslide that incorporates interactive gaming play. The improved waterslide may provide a more exciting riding experience as riders become immersed in a gaming story or adventure and operate controls that alter display or ride features to provide a unique experience with each ride.

Figure 1:
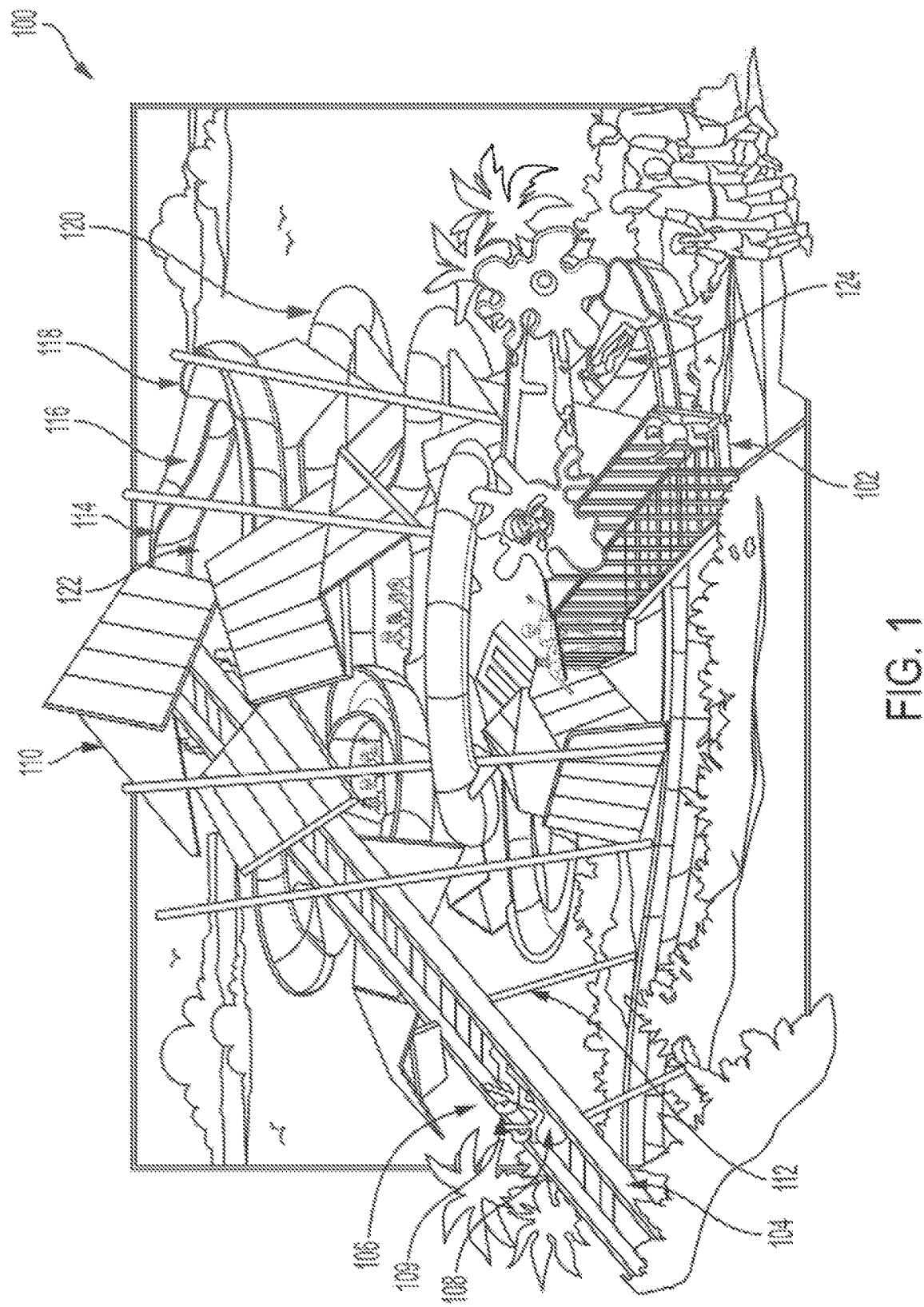
FIG. 1 shows a perspective view of a waterslide attraction capable of incorporating gaming elements according to an embodiment of the present invention.

FIG. 1 illustrates a perspective view of an entrance to a waterslide attraction 100 incorporating interactive game play. A boarding area or queue entrance 102 may be located at the top or bottom of the waterslide attraction 100. The waterslide attraction 100 may be placed to accommodate particular terrain and riders may enter at the top of the waterslide attraction and exit at the bottom. In an alternative embodiment, riders may enter at the bottom of the waterslide attraction 100 and proceed through a queue line that leads to the entrance 102 and may incorporate stairs, escalators, ramps, or other means of moving riders to the beginning of the ride. In an embodiment depicted in FIG. 1, riders 106 may board the waterslide attraction 100 at the lower elevation and may ride in a ride vehicle 108, as shown in FIG. 1. In various embodiments, the ride may start at any desired location (e.g. a high elevation, a low elevation, etc.), for example, based upon terrain or designed support structures.

Ride vehicle 108 may incorporate viewing devices and/or controls 109 for entering responses to signals, stimuli, and/or storylines as the ride progresses. Rider response and/or interaction during ride progression may include certain features that are the same as or similar to those disclosed in other United States Patent Applications, such as U.S. Pat. Publication No. 2018-0284881 and U.S. Pat. No. 9,764,245, which are hereby incorporated by reference and whose concepts may be modified or supplemented by the disclosures herein. These viewing devices and controls 109 may alter the rider 106 experience with each ride, as described further below. A ramp 104 may transport riders in ride vehicles 108 to the start of the ride experience. The waterslide attraction 100 may incorporate multiple design elements 110. These design elements 110 may be used to depict a theme of the interactive gaming feature and may also be used to display information about the ride and the storyline may be shaped to reflect a theme for the water attraction 100 and may also serve as a cover or awning.

Support structure 112 may be substantially as depicted, as a scaffolding structure to support the flumes or slides and ride elements of the waterslide attraction. Support structure 112 may incorporate multiple stairs and viewing sections as depicted in FIG. 1. In an alternative embodiment, support structure 112 may be reduced to accommodate sloping terrain. Support structure 112 may be adapted to the terrain and riders may enter at the top of the ride and exit at the bottom. The support structure 112 may also be adapted to allow riders to enter at the bottom of the ride and climb to the top for the ride down, as shown in FIG. 1. In alternative embodiments, any of a variety of desired entrance or exit positions for an attraction may be used. Sequenced light bars or viewing screens may be incorporated into design element 110. Music or other signals (e.g., audible, visual, vibrational, etc.) as well as video may be incorporated and used to indicate that a rider is about to launch and may also introduce the storyline of the ride. The audible tone and/or light elements may indicate boarding initiation and may be used to entertain riders waiting to board.

An entry slide or flume 114 connects the ramp 104 with the first slide or flume element 114. The first slide element 114 accelerates a rider 106 in a ride vehicle 108 incorporating controls 109 on a sliding surface 116 propelled by water forced along the first slide or flume 114 toward the first turn or ride element 118. While shown as a turn, first ride element 118 may be a story element or other waterslide feature. First slide or flume 114 may be a downward sloping ramp to move the rider 106 in ride vehicle 108 down the ride with sufficient speed to enter the first ride element 118 with sufficient speed to progress through the ride. First slide or flume 114 may be angled substantially as shown in FIG. 1. The configuration causes the rider 106 in ride vehicle 108 to move from one element or section of the ride to the next.

Upon exiting from first turn or ride element 118 a rider 106 may enter a second ride element such as turn 120. The second ride element may also be a storyline element section 122. Storyline element sections, similar to storyline element section 122 may alternate with elements such as turns or curves similar to first ride element 118 and subsequent elements 122 may enter an exit flume or slide 124. Exit flume or slide 124 directs a rider into runout pool (not shown in FIG. 1).

Figure 2:
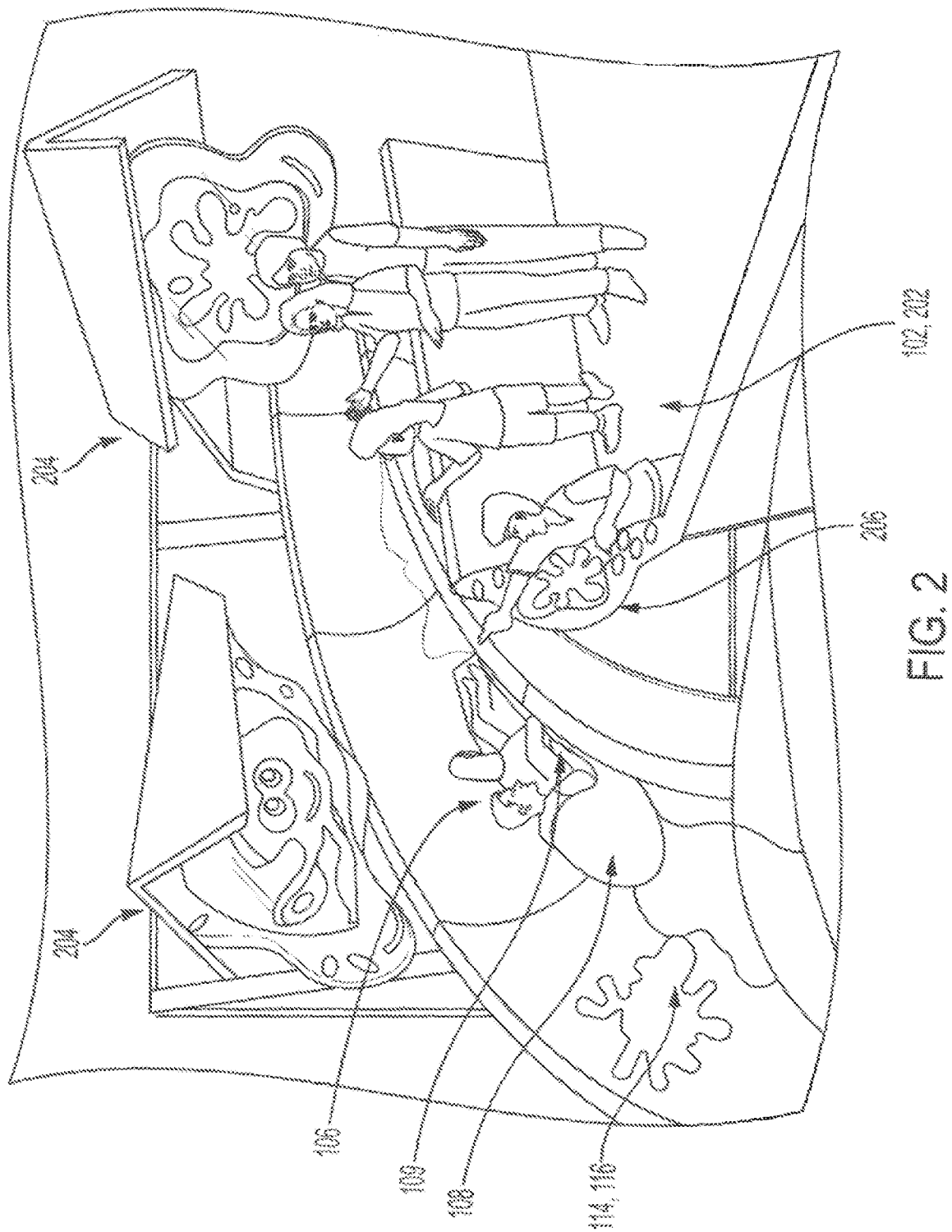
FIG. 2 shows an interactive queue element of a waterslide attraction capable of incorporating gaming elements according to an embodiment of the present invention.

With continued reference to FIG. 1, FIG. 2 shows the integration of the storyline elements with the waterslide elements. The queue line 102 may incorporate viewing areas 202. These viewing areas 202 may incorporate viewing screens 204 that may introduce riders 106 in ride vehicle 108 to the characters in the story and may provide information on how to play the interactive game elements. Ride vehicle 108 may incorporate controls that allow riders 106 to activate features such as mock weapons, aim at targets, activate a character's movement, or the like. Any of a variety of possible storytelling aspects may be manipulated and/or modified in response to rider interaction. Controls may also allow riders 106 to alter the speed of ride vehicle 108, change direction, or the like. In certain embodiments, rather than or in addition to riders 106 control of speed of the ride vehicle 108, the waterslide attraction 100 itself may be designed such that ride vehicle 108 movement is slowed in areas involving storytelling elements and or rider interaction capabilities (e.g., by slowing the speed of water flow, by adjusting the slope of the flume containing the ride vehicle 108 to have less of a downward orientation, etc.). For example, certain geographic locations may contain terrain that would normally be unsuitable for a conventional waterslide attraction (e.g., due to elevation changes that would be too costly to modify or scaffold in order to build a traditional attraction, but may be better suited for the design of a waterslide attraction containing storytelling elements where a slowing of a rider is desired at certain locations.

In another embodiment, spectators in viewing areas 202 may also activate controls that alter the display on screens 204. Those waiting in the queue line 102 may be able to practice commands or actions that will be used in the ride. The storyline may allow riders to accumulate points, solve a mystery, go on an adventure, or other engrossing storyline activities. The interactive gaming features are activated with controls 110 in ride vehicle 108. In another embodiment, riders 106 may compete against one another and others for points. These game points may be displayed at the end of the ride, sent to a user through a mobile or other application. Water attraction operators may incorporate the scoring features into a variety of incentive programs to encourage additional visits and ridership. Storylines may be varied depending on the time of day, or night and may be varied to anticipate the age of riders expected at particular times. In an additional embodiment, the theme of the ride may be sunny and upbeat during the day, when younger riders are expected and may change to a darker theme and story at night, when teenagers and adults are present.

Exemplary rider vehicles 108 may include ride controls 110. Ride controls may take on any combination of inputs such as joystick, button(s), toggle, switch, camera, light, gesture recognition, facial recognition, arrows, proximity sensor, etc. Exemplary ride controls may be used as inputs to make selections within the ride experience. The ride controls may create responses within the system, such as in progressing or altering the story line of a theme, changing ride characteristics, for example, without limitation, changing flow rates, changing vehicle direction, changing vehicle speed, changing displays visible along the ride path, and combinations thereof.

Figure 3A:
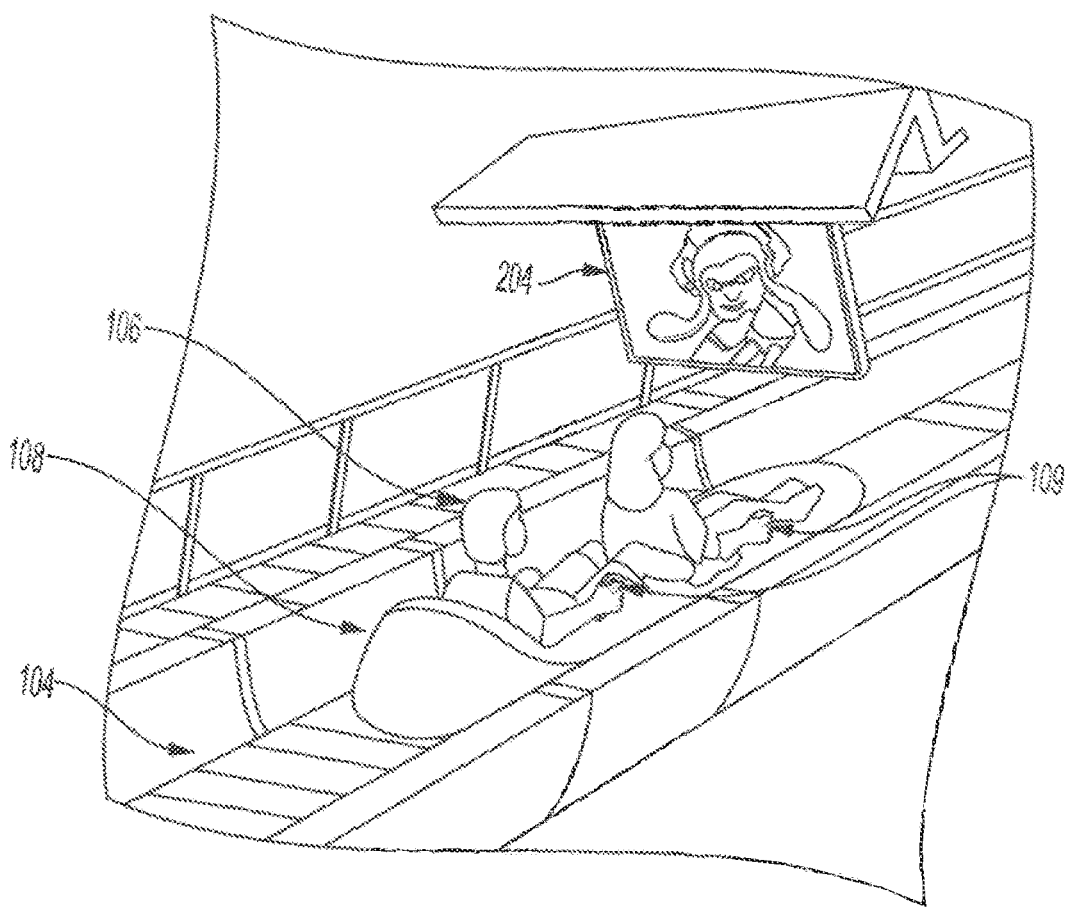
FIGS. 3A-3F shows the flow of a ride on a waterslide attraction capable of incorporating gaming elements according to an embodiment of the present invention.

FIG. 3A-3F shows one exemplary sequence for the rider 106 in the ride vehicle 108. In FIG. 3A, riders 106 in ride vehicle 108 are entering the ride on ramp 104. They may be viewing a screen 204 that provides an introduction to the storyline and may also explain operation of the ride vehicle 108 controls 109 that may be actuated during the ride. Although controls 109 are explicitly illustrated as manipulatable elements associated with the ride vehicle 108, in alternative embodiments, controls may be in the form of elements worn by riders 106 (e.g., bracelets, rings, anklets, etc.) or handled by riders (e.g., mobile device such as a cell phone or other handheld device) that contain elements for interaction (e.g., buttons, switches, etc.) or do not contain additional elements for interaction but may be read or sensed as the rider travels along the attraction (e.g., an RFID card associated with a rider that changes the storytelling or other ride features—for example—a rider whose RFID card indicates is a female under the age of 10 may have the storytelling modified from that of a rider whose RFID card indicates is a male over the age of 16). Controls 109 in some additional embodiments activate water feature characteristics, such as waves, or direction of travel. Inputs from controls 109 alter or otherwise change the storyline. To give one example, a rider 106 may input a response using controls 109 that shoots a target of threat to another character in the storyline. The response from controls 109 may alter the display 204 and a rider 106 may receive a cue (e.g., audible, visual, vibration, etc.) that the action was or was not successful. Successful actions may alter the progress of the ride, and similar to other interactive gaming experiences, additional screens or skills may be unlocked.

Figure 3B:
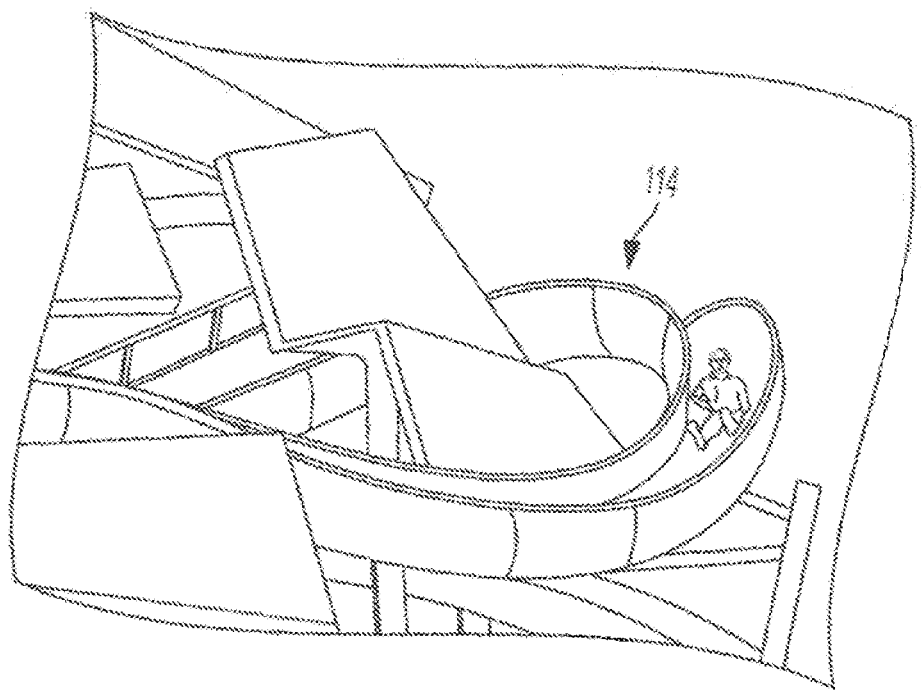
Figure 3C:
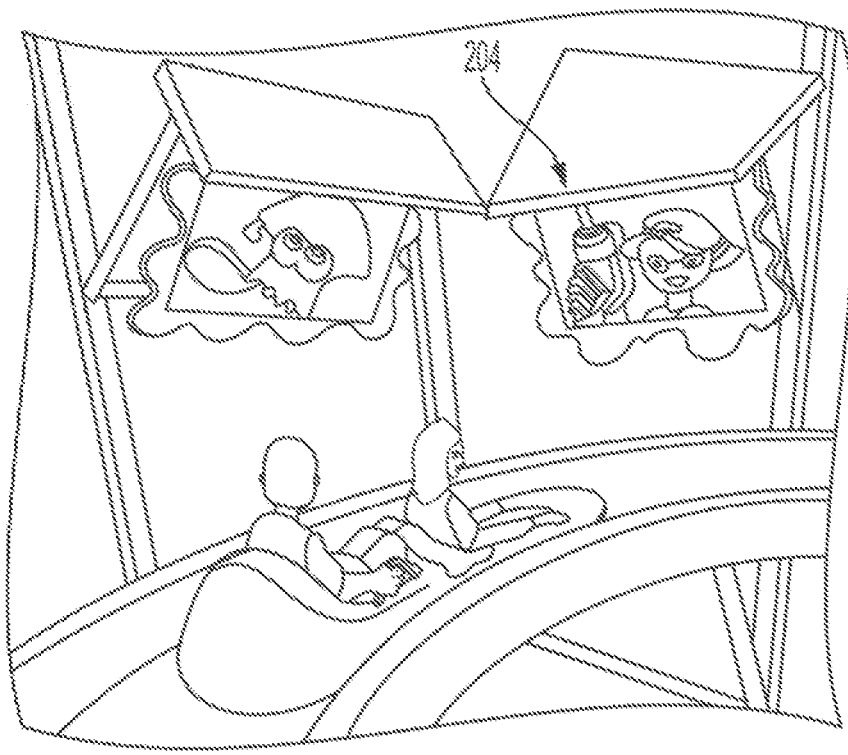

FIG. 3B shows riders 106 in a ride vehicle 108 navigating a ride element 114. Ride elements 114 may be interspersed with storyline elements 122. FIG. 3C illustrates viewing screens 204, which may be located in various sections of the ride. These screens 204 may include audible elements and music to further enhance the storyline and keep riders engrossed in the storyline. In alternative embodiments, any of a variety of other sensory elements may be provided in addition to, or in replacement of, audible elements (e.g., vibration, lighting, scents, etc.) These screens 204 may display different aspects of the storyline and may vary with each ride, permitting riders to have a unique experience each ride.

Figure 3D:
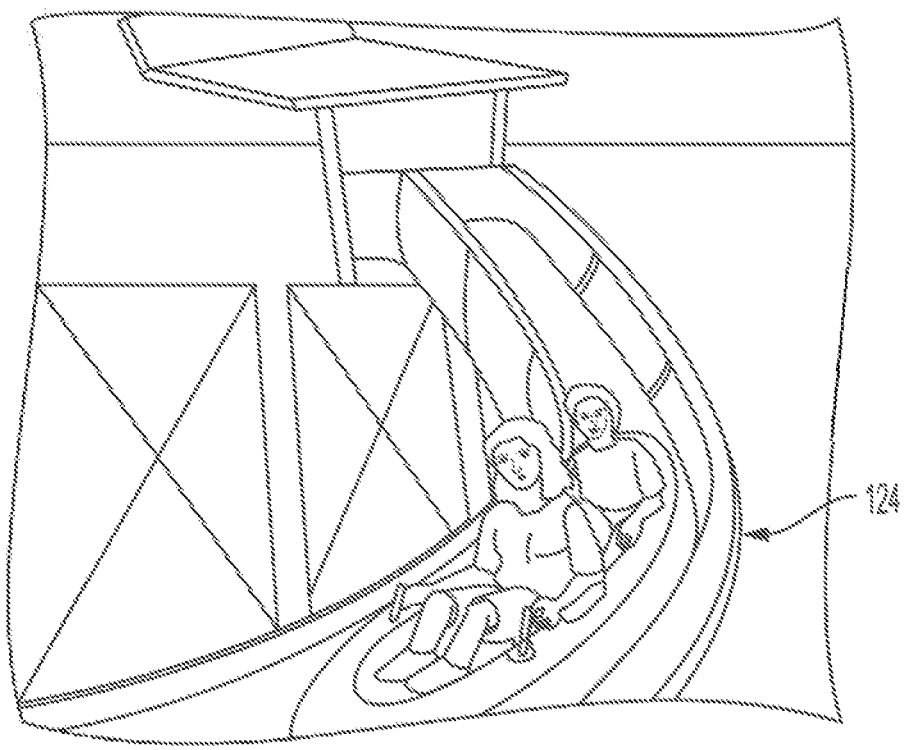
Figure 3E:
Figure 3F:
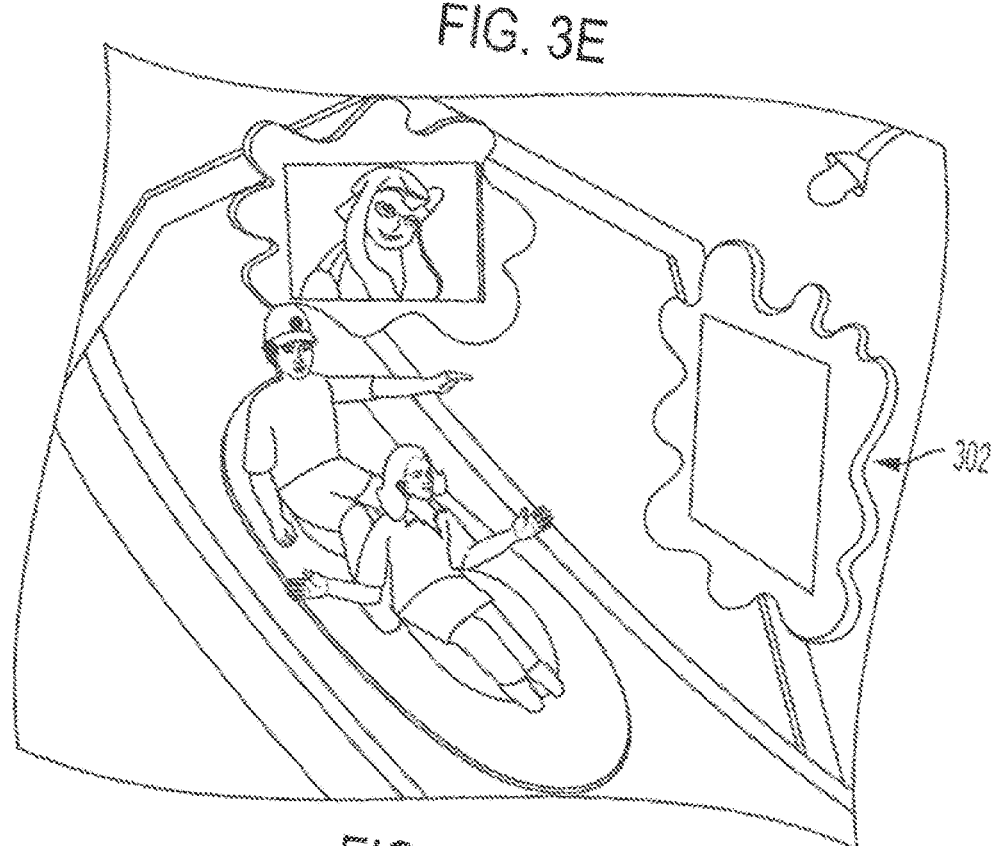

FIG. 3D illustrates the exit flume 124. FIG. 3F shows riders 106 viewing a results screen 302 that may provide a score for each rider 106, or may provide a composite score for the team in ride vehicle 108. Scores may also be provided to riders 106 through an application and may be used to incentivize riders to return to the ride.

A particular waterslide attraction may be configured using the same or similar features described above for single riders, double riders, or family riders. Riders may ride the waterslide attraction with or without a ride vehicle, and the ride elements may be adapted to work in cooperation with the ride vehicle.

In an exemplary embodiment a video story may be displayed sequentially to a rider through a plurality of displays positioned along the ride path. The video story may define a plurality of alternative sequential scene options to be displayed on sequential displays along the ride path. Exemplary embodiments of the waterslide attraction may be configured to receive inputs from a rider along the ride path. The inputs may define which of the plurality of alternative sequential scene options are displayed to the rider. For example, a rider may be posed with a decision to have a character go to a location or perform an action and the rider may provide an input to selection the decision or selected action. The subsequent displays may display a storyline based on the rider input following the decision or selected action. Instead or selecting actions of a displayed character or scene, the rider may also provide inputs to engage directly in the video story as a character in the story. For example, a rider may be posed with an attack by a character and must enter an input to make the action of performing a counter attack (i.e. martial arts, shooting, etc.) or dodging the attack. The sequential scenes may then incorporate the input of the rider and a response action in the characters within the video story. In an exemplary embodiment the display may include other gaming activities beyond or alternatively to the video story.

In an exemplary embodiment, the ride may incorporate a theme in conjunction with the video story. For example, the ride may be of explorers that have been miniaturized and inserted into the bloodstream of a person. The riders, as explorers through the bloodstream, may have to fend off antibodies that are attacking the ride vehicle, or may have to select which blood vessel branch they traverse. The ride characteristics may correspond to the storyline such as changing directions with a change in vessel path or changing speed based upon the vessel path selected. The ride experience, including, without limitation, the visual ride characteristics, may correspond to the video story theme. In an exemplary embodiment, a rider may select a theme at the beginning of the ride. In an exemplary embodiment, the ride theme may be determined at the outset and the sequential video sequences determined based on the initial scene selection. Alternatively, or in addition thereto, the video story may be dynamically altered during the ride experience within the select theme.

Although video displays are disclosed herein as the presentation of a video storyline, embodiments of the disclosure are not so limited. Other storylines may be provided and altered according to embodiments described herein. For example, mechanical and/or electrical components and displays may provide a rider experience. Alterations in this components may be made based on a user input according to embodiments described herein.

Exemplary embodiments may also include rider inputs provided through one or more other sensors in the system. For example, weight sensors, proximity sensors, cameras, or other sensors may determine a position or a change in the position of the rider within a ride vehicle. The rider position and/or change in rider position may be used as an input.

Any of the above features discussed may be utilized or incorporated or combined with or into other waterpark or amusement park attractions discussed or retrofitted onto existing waterpark or amusement park ride designs. The previous description of the disclosed examples is provided to enable any person of ordinary skill in the art to make or use the disclosed methods and apparatus. Accordingly, the terminology employed throughout should be read in a non-limiting manner. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and/or methods.

What is claimed is:

1. A waterslide attraction comprising:
   a flume with a flow of water thereon to define a ride surface, and
   at least one storyline element visible to a rider on the ride surface on one or more displays positioned along the ride surface;
   a ride vehicle for carrying the rider on the ride surface; and
   a first sensor configured to receive a first input from the rider for changing the at least one storyline element based on the first input; and
   a second sensor configured to receive a second input from a spectator that is not riding the waterslide attraction that alters a display of the one or more displays positioned along the ride surface.

2. The waterslide attraction of claim 1, wherein the at least one storyline element is a video story displayed to the rider on the one or more displays positioned along the ride surface.

3. The waterslide attraction of claim 2, wherein the first input changes the video story on subsequent displays of the one or more displays to provide stimuli presented as part of a storyline using controls incorporated into the ride vehicle.

4. The waterslide ride attraction of claim 1, further including a scoreboard displayed to riders at the end of the waterslide attraction.

5. The waterslide attraction of claim 1, wherein the first input comprises a hand gesture performed by the rider.

6. The waterslide attraction of claim 1, wherein the first input comprises a facial feature of the rider.

7. The waterslide attraction of claim 1, wherein the first input comprises a position of the rider on the ride vehicle.

8. The waterslide attraction of claim 1, further comprising a third sensor configured to receive a third input from a second rider for changing the at least one storyline element based on the third input, wherein the third input received through the third sensor changes a ride characteristic of the waterslide attraction, and wherein the third input includes a visually detected aspect of the rider.

9. The waterslide attraction of claim 1, further comprising a third sensor to receive a third input from a second rider for changing the at least one storyline element based on the third input, wherein the third input received through the third sensor changes a ride characteristic of the waterslide attraction, and wherein the third input includes an audible action performed by the rider.

10. The waterslide attraction of claim 1, wherein the rider receives an audible cue indicating whether the first input was successful.

11. The waterslide attraction of claim 1, wherein the rider receives a visual cue indicating whether the first input was successful.

12. The waterslide attraction of claim 1, wherein the rider receives a rider score determined by the quality of the first input received by the first sensor, and wherein the rider may unlock additional ride characteristics of the waterslide attraction after accruing a sufficiently high rider score.

* * * * *